(12) United States Patent
Zheng et al.

(10) Patent No.: US 10,863,188 B2
(45) Date of Patent: Dec. 8, 2020

(54) METHOD AND APPARATUS FOR NON-UNIFORM MAPPING FOR QUANTIZATION MATRIX COEFFICIENTS BETWEEN DIFFERENT SIZES OF QUANTIZATION MATRICES IN IMAGE/VIDEO CODING

(71) Applicant: Futurewei Technologies, Inc., Plano, TX (US)

(72) Inventors: Jianhua Zheng, Beijing (CN); Chen-Xiong Zhang, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 190 days.

(21) Appl. No.: 14/860,299

(22) Filed: Sep. 21, 2015

(65) Prior Publication Data

US 2016/0088302 A1 Mar. 24, 2016

Related U.S. Application Data

(60) Provisional application No. 62/052,852, filed on Sep. 19, 2014.

(51) Int. Cl.
*H04B 1/66* (2006.01)
*H04N 7/12* (2006.01)
(Continued)

(52) U.S. Cl.
CPC ........... *H04N 19/46* (2014.11); *H04N 19/126* (2014.11)

(58) Field of Classification Search
CPC .................... H04N 19/124; H04N 19/126
See application file for complete search history.

(56) References Cited

U.S. PATENT DOCUMENTS

| 5,923,787 A * | 7/1999 | Hara | G06T 9/005 |
| | | | 358/426.14 |
| 2003/0021486 A1* | 1/2003 | Acharya | G06T 3/4084 |
| | | | 382/250 |

(Continued)

FOREIGN PATENT DOCUMENTS

CN 103238328 A 8/2013

OTHER PUBLICATIONS

Zheng et al. ("Investigation of sub-sampling representation methods for quantization matrices", 9. JCT-VC Meeting; 100. MPEG Meeting; Apr. 27, 2012-May 7, 2012; Geneva; (Joint Collaborative Team on Video Coding of ISO/IEC JTC1/SC29/ WG11 and ITU-T SG.16); No. JCTVC-I0364, Apr. 17, 2012.*

(Continued)

*Primary Examiner* — Fabio S Lima
(74) *Attorney, Agent, or Firm* — Schwegman Lundberg & Woessner, P.A.

(57) ABSTRACT

A method for non-uniform mapping for quantization matrix coefficients between different sizes of quantization matrices in image/video coding includes obtaining a first quantization matrix and identifying a second quantization matrix to be formed therefrom. The second quantization matrix is a factor of two larger than the first quantization matrix. The second quantization matrix is populated with values from the first matrix through non-uniform mapping of the first quantization matrix. Non-uniform mapping to populate the second quantization matrix includes directly mapping values of all or a portion of the first quantization matrix into a most upper left portion of the second quantization matrix and mapping up-sampling values of the first quantization matrix into a remaining portion of the second quantization matrix. A frequency position pattern may be applied to the first quantization matrix to directly map only those values within the (Continued)

frequency position pattern into a most upper left portion of the second quantization matrix.

13 Claims, 12 Drawing Sheets

(51) Int. Cl.
*H04N 11/02* (2006.01)
*H04N 11/04* (2006.01)
*H04N 19/46* (2014.01)
*H04N 19/126* (2014.01)

(56) References Cited

U.S. PATENT DOCUMENTS

| | | | |
|---|---|---|---|
| 2003/0067980 A1* | 4/2003 | Shen | H04N 19/176 375/240.03 |
| 2008/0031346 A1* | 2/2008 | Segall | H04N 19/30 375/240.19 |
| 2010/0091842 A1* | 4/2010 | Ikeda | H04N 19/176 375/240.03 |
| 2012/0140815 A1 | 6/2012 | Zhou et al. | |
| 2013/0101033 A1 | 4/2013 | Joshi et al. | |
| 2013/0114695 A1* | 5/2013 | Joshi | H04N 19/463 375/240.03 |
| 2013/0272391 A1* | 10/2013 | Zheng | H04N 19/00096 375/240.03 |
| 2013/0343451 A1* | 12/2013 | Sato | H04N 19/115 375/240.03 |
| 2014/0072037 A1 | 3/2014 | Sato | |
| 2014/0369407 A1* | 12/2014 | Tanaka | H04N 19/70 375/240.03 |
| 2015/0078442 A1* | 3/2015 | Lim | H04N 19/176 375/240.03 |

OTHER PUBLICATIONS

"International Application Serial No. PCT/US15/51245, International Search Report dated Jan. 6, 2016", 3 pgs.

"International Application Serial No. PCT/US15/51245, Written Opinion dated Jan. 6, 2016", 5 pgs.

"European Application No. 15842202.2, Extended European Search Report dated May 18, 2017", (May 18, 2017), 6 pgs.

Zheng, Jianhua, "Adaptive frequency weighting quantization in macroblock level", JCTVC-B059, Jul. 21, 2010-Jul. 28, 2010, 6 pages, XP030007639, (Jul. 24, 2010), 6 pgs.

Zheng, Jianhua, "Investigate of sub-sampling representation methods for quantization matrices", JCTVC-I0364, Apr. 27, 2012-Jul. 5, 2012, 8 pages, XP030112127, (Apr. 17, 2012), 8 pgs.

"Chinese Application No. 201580046388.1, First Office Action dated Feb. 19, 2019", (Feb. 19, 2019), 47 pgs.

\* cited by examiner

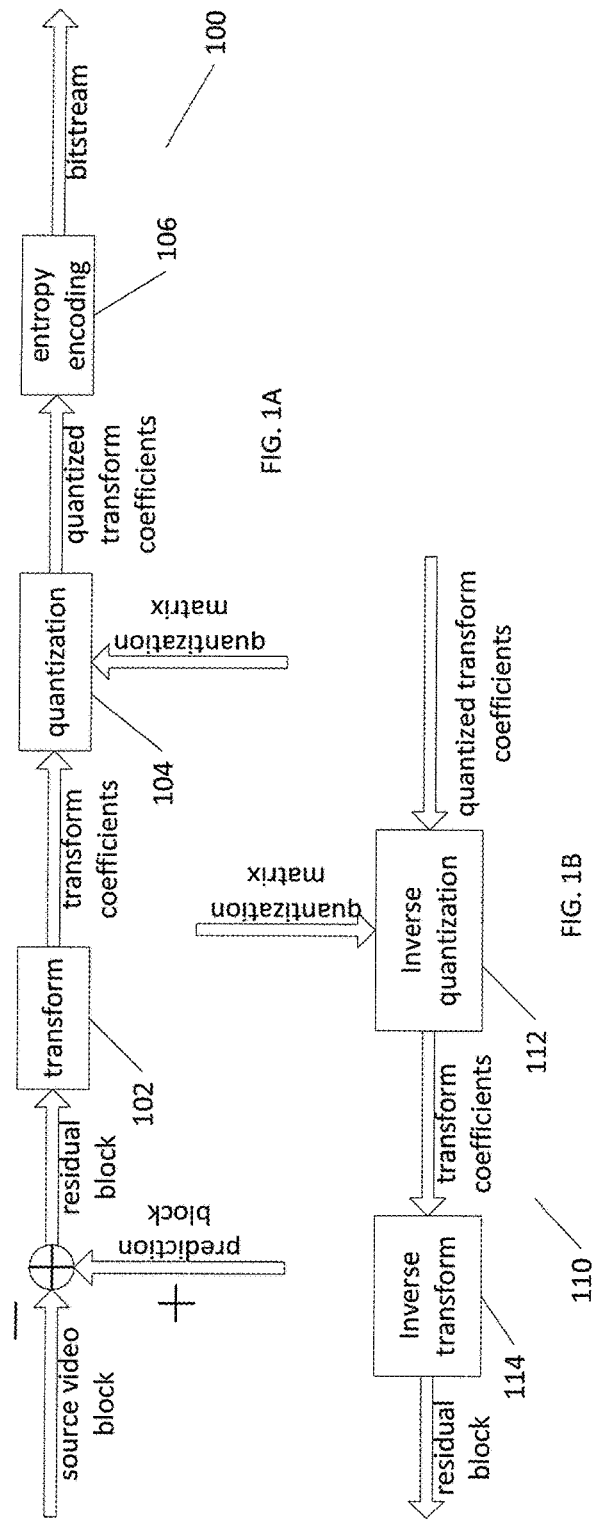

METHOD AND APPARATUS FOR NON-UNIFORM MAPPING FOR QUANTIZATION MATRIX COEFFICIENTS BETWEEN DIFFERENT SIZES OF QUANTIZATION MATRICES IN IMAGE/VIDEO CODING

RELATED APPLICATIONS

This application claims the benefit of U.S. Provisional Application No. 62/052,852 filed Sep. 19, 2014, which is hereby incorporated by reference herein.

TECHNICAL FIELD

The present disclosure relates in general to high efficiency video coding and more particularly to a method and apparatus for non-uniform mapping for quantization matrix coefficients between different sizes of quantization matrices in image/video coding.

BACKGROUND

In high efficiency video coding (HEVC), a quantization matrix may be extended to over an 8×8 size. Quantization matrices of larger sizes (e.g. 16×16 and 32×32) may be used and stored as separate 8×8 quantization matrices in a picture parameter set (PPS) and/or a sequence parameter set (SPS). For example, on an encoder side, a larger quantization matrix may be down-sampled or subsampled into an 8×8 matrix. On a decoder side, the larger quantization matrix may be reconstructed from the down-sampled 8×8 matrix via up-sampling methods. Overall, the down-sampled 8×8 quantization matrices may hold all down-sampled values of 16×16 matrices or 32×32 matrices to reduce the stored bits. The down-sampled values in the separated 8×8 matrix may be the average values of 24×24 frequency neighboring components in a 16×16 matrix or the average values of 4×4 frequency neighboring components in a 32×32 matrix.

However, the statistical property of transform (e.g., DCT) coefficients in larger transformed blocks may be different from those in smaller blocks. For example, a percentage of zero coefficients in a 32×32 transformed block may be greater than that in an 8×8 transformed block. Thus, coefficient energy in the 32×32 transformed block may be more concentrated to the low frequency part (corresponding to the top-left region of the transformed block) if compared to the 8×8 transformed block. If a 32×32 quantization matrix is reconstructed from the down-sampled 8×8 quantization matrix, the weighting values in the 8×8 matrix may be mapped to the 32×32 quantization matrix by simple value duplication, which introduces frequency band mapping error and results in subjective artifacts.

SUMMARY

From the foregoing, it may be appreciated by those skilled in the art that a need has arisen for a technique to reduce frequency band mapping error in high efficiency video coding. In accordance with the present disclosure, a method and apparatus for non-uniform mapping for quantization matrix coefficients between different sizes of quantization matrices in image/video coding are provided that greatly reduce or substantially eliminate problems and disadvantages associated with current high efficiency video coding techniques.

According to an embodiment, there is provided a method for non-uniform mapping for quantization matrix coefficients between different sizes of quantization matrices in image/video coding that includes obtaining a first quantization matrix and identifying a second quantization matrix to be formed from the first matrix. The second quantization matrix is a factor of two larger than the first quantization matrix. The second quantization matrix is populated with values from the first matrix through non-uniform mapping of the first quantization matrix. Non-uniform mapping to populate the second quantization matrix includes directly mapping values of the first quantization matrix into a most upper left portion of the second quantization matrix and mapping up-sampling values of the first quantization matrix into a remaining portion of the second quantization matrix. A portion of the first quantization matrix may be defined by a pair of offset values where direct mapping is performed of values in the portion of the first quantization matrix defined by the offset values into a most upper left portion of the second quantization matrix and mapping of up-sampling values of the first quantization matrix is performed into a remaining portion of the second quantization matrix. A frequency position pattern may be applied to the first quantization matrix to directly map only those values of the first quantization matrix within the frequency position pattern into a most upper left portion of the second quantization matrix.

The present disclosure describes many technical advantages over conventional high efficiency video coding techniques. For example, one technical advantage is to perform non-uniform reconstruction of a larger matrix from a smaller matrix. Another technical advantage is to designate certain portions of the smaller matrix for use in the reconstruction of the larger matrix. Yet another technical advantage is the gain in response time as compared to conventional techniques. Other technical advantages may be readily apparent to and discernable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIGS. 1A-1B illustrate part of an example high efficiency video coding system;

FIG. 2 illustrates three typical frequency band distribution models for an 8×8 transformed matrix block;

DETAILED DESCRIPTION

Figure 3:
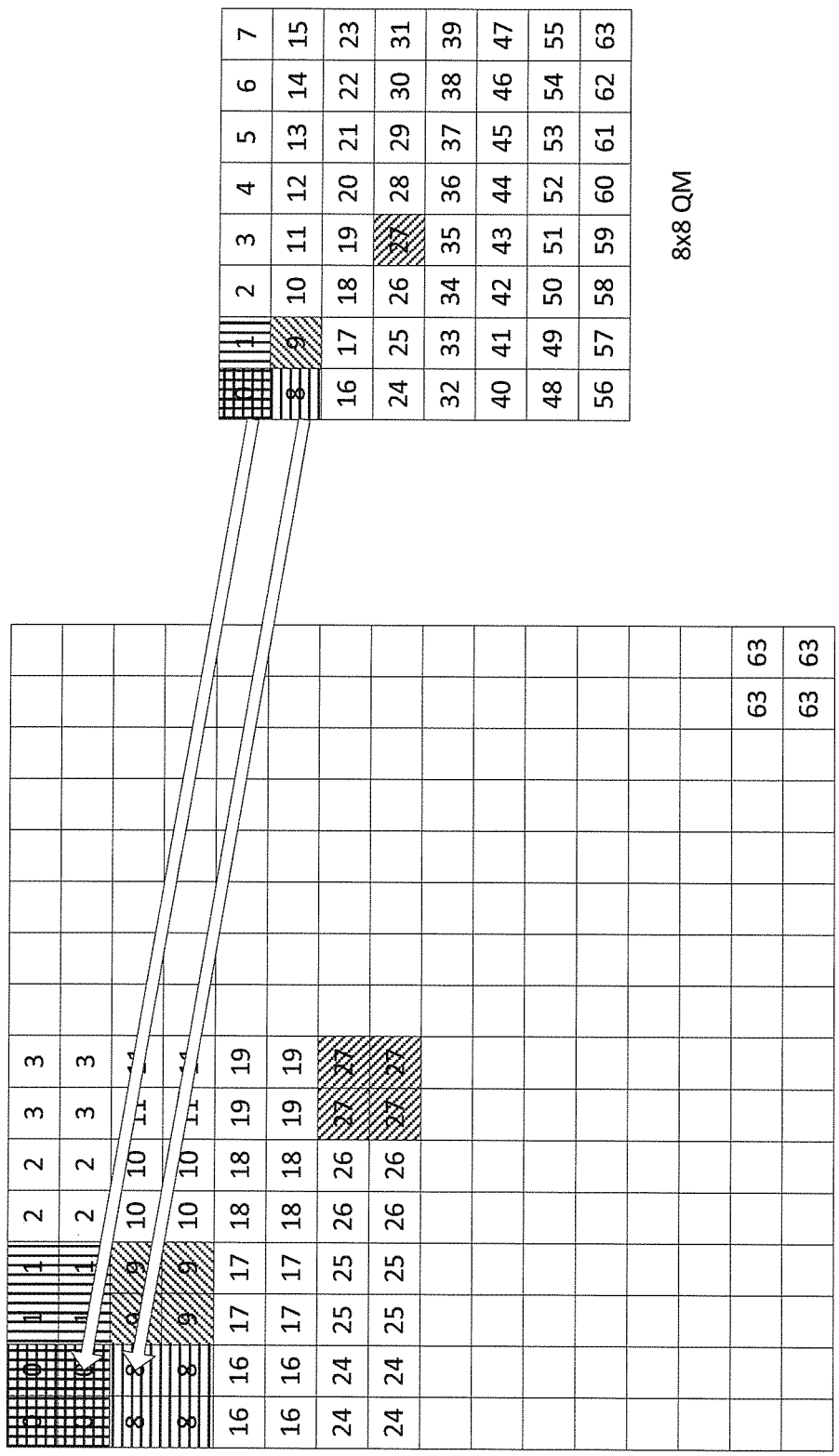
FIG. 3 illustrates an example uniform mapping scheme reconstructing a 32×32 matrix from an 8×8 matrix.

FIGS. 1 through 14, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system. Features shown and discussed in one figure may be implemented as appropriate in one or more other figures.

When coding a block of pixels in a picture or video frame, a prediction block may be generated based on one or more previously coded reference blocks using either inter prediction or intra prediction. The prediction block may be an estimated version of the original block. A residual block may be generated by subtracting the original block from the prediction block, or vice versa, which may represent prediction residuals or errors. Since an amount of data needed to represent the prediction residuals may typically be less than an amount of data needed to represent the original block, the residual block may be encoded to achieve a higher compression ratio.

Then, residual values of the residual block in a spatial domain may be converted to transform coefficients in a frequency domain. The conversion may be realized through a two-dimensional transform, e.g., a transform that closely resembles discrete cosine transform (DCT). In a transform matrix, low-index transform coefficients (e.g., located in a top-left region) may correspond to big spatial features and have relatively high magnitudes, while high-index transform coefficients (e.g., located in a bottom-right region) may correspond to small spatial features and have relatively small magnitudes. Further, a quantization matrix (QM) comprising quantization coefficients may be applied to the transform matrix, thereby quantizing all transform coefficients to become quantized transform coefficients. As a result of quantization, the scale or magnitude of transform coefficients may be reduced. Some high-index transform coefficients may be reduced to zero, which may then be skipped in subsequent scanning and coding steps.

FIGS. 1A-1B illustrate parts of an example high efficiency video coding system. In FIG. 1A, a video encoder 100 comprises a transform unit 102, a quantization unit 104, and an entropy encoder 106. Although not shown in FIG. 1A, it should be understood that other units known to those skilled in the art, such as a prediction unit, a dequantization unit, a reconstruction unit, etc., may also be present in the video encoder 100. In operation, the video encoder 100 may obtain or acquire a source picture or video frame, which may include multiple video blocks. In the interest of clarity, the encoding of one source video block is considered here as an example. To encode the video block, a prediction block may first be generated as an estimation of the video block. Recall that the prediction block may be generated via inter or intra prediction by a prediction module. Then, a difference between the source video block and the prediction block may be computed to generate a residual block. The residual block may be transformed by the transform unit 102 into transform coefficients. During transform, residual pixel values in a spatial domain, which comprises big features and small features, are converted to transform coefficients in a frequency domain, which comprises high frequency bands and low frequency bands. Afterwards, the quantization unit 104 may use a QM to quantize the transform coefficients, thereby generating quantized transform coefficients. Further, the quantized transform coefficients may be encoded by the entropy encoder 106 and eventually transmitted from the video encoder 100 as part of a bitstream.

In FIG. 1B, a video decoder 110 comprises an inverse quantization unit 112 and an inverse transform unit 114. Although not shown in FIG. 1B, it should be understood that other units known to those skilled in the art, such as an entropy decoder, a prediction processing unit, a reconstruction unit, etc., may also be present in the video decoder 110. Video encoder 100 may also include an inverse quantization unit 112 and an inverse transform unit 114 for regenerating the residual blocks for use in creation of the prediction block. In operation, video decoder 110 receives a video bitstream that is entropy decoded to generate the quantization transform coefficients. Inverse quantization unit 112 uses a quantization matrix to dequantize the quantization transform coefficients to obtain the transform coefficients. Inverse transform unit 114 generates the residual block from the transform coefficients. Video decoder 110 then creates the decoded video from the residual blocks.

It can be seen from the video encoder 100 that a QM is used as an integral part of the video encoding process. Configuration of the QM may determine how much information of the transform coefficients to preserve or filter out, thus the QM may impact coding efficiency as well as coding quality. In fact, the QM may be needed not only in an encoder but also in a decoder. Specifically, to correctly decode pictures, information regarding quantization coefficients in QMs may be encoded in an encoder and transmitted from the encoder to the decoder. In video coding techniques and standards, a QM may sometimes be referred to as a scaling matrix or a weighting matrix. Thus, the term "QM" used herein may be a general term covering scaling matrix, weighting matrix, quantization matrix, and other equivalent terms.

HEVC design may use four block sizes: 4×4, 8×8, 16×16, and 32×32. Further, there may be separate QMs for 4×4, 8×8, 16×16, and 32×32 blocks, separate QMs for intra prediction and inter prediction, and separate QMs for YUV components. Accordingly, there may be a total of 24 (i.e., 4×2×3) QMs. QMs with size larger than 8×8 are usually referred as larger size QM, such as 16×16 and 32×32 QMs (note that terms such as larger and smaller are relative terms, thus their corresponding sizes may vary depending on context).

In AVS2 design, block sizes are similar with the design of HEVC, however, in AVS2, the quantization matrix is represented as a parameterized scheme. According to the characteristics of Human Vision System (HVS), different frequency positions in the transformed coefficient block will lead to different perceptual effects for human eyes. A frequency component in one position has a similar perceptual property with its nearby position in the quantization matrix. Hence, the transformed block could be divided into different frequency bands according to HVS. Frequency band in one transformed block stands for different perceptual property. Transformed coefficients in the same frequency band have similar perceptual features. According to the importance of the frequency bands, the weighting values can be grouped into the different frequency bands, with the purpose of controlling the quality and rate-distortion capability of a block. Hence, each frequency band can be denoted with one parameter. The whole matrix of a transformed block can be modeled as several frequency band weighting factors and their distribution.

FIG. 2 illustrates three typical frequency band distribution models for an 8×8 transformed block. In FIG. 2, every frequency band is responding to a weighting factor, wq_param[i] (i=0 . . . 6), and every frequency band distribution model is indicated by wq_model (wq_model=0,1,2). The three typical distributions also include band weighting parameters pl, pa, pb, pc, pd and ph indexed by i. Bands (pa-pd) have high sensitivity frequencies to human eyes. To combine the frequency band distribution models and the frequency band weighting parameters, an 8×8 frequency weighting matrix may be constructed. The matrices are stored as six band parameters and one wq_model index. The bit consumption for quantization matrix is reduced. It also easily controls the coded picture quality for the end-user instead of changing each frequency component in the quantization matrices.

Based on the frequency band distribution model (indicated by wq_model), the adjustment of the frequency band weighting parameters can efficiently and easily control the block's subjective quality. wq_model and wq_param[i] (i=0 . . . 6) are coded in the bitstream to allow adaptive changing of these parameters for each picture. The frequency band distribution models are referred to as frequency position pattern, which indicates the distribution of the weighting parameters in the quantization matrix. Since the frequency position relations of the quantization matrix, scaling matrix, and transformed coefficients matrix are identical, for a certain distribution of coefficients in the matrix, they have the same frequency position pattern of coefficients in the matrix. Uniform or non-uniform mapping is operated on the frequency domain. Therefore, in this disclosure, the disclosed scheme is described using a quantization matrix as an example to apply non-uniform mapping on a quantization matrix. The disclosed scheme is still suitable for applying non-uniform mapping on a scaling matrix, a transformed coefficients matrix, a frequency position pattern, and a frequency weighting quantization model.

Because the coefficients of energy in the 32×32 QM may be more concentrated to the low frequency part (corresponding to the top-left region of the matrix) as compared to the 8×8 QM, uniform mapping may produce unwanted errors. For example, if uniform mapping is used to reconstruct a 32×32 QM from the 8×8 QM, the frequency position (3,3) in the 8×8 QM is mapped to (15,15) in the 32×32 QM. The frequency position (3,3) in the 8×8 matrix may belong to a middle frequency region. However, since the coefficients of energy in the 32×32 QM may be more concentrated to the low frequency part than the 8×8 transform matrix, the frequency position (15,15) in 32×32 QM may belong to the high frequency region instead of the middle frequency region. Such mapping will generate a frequency mapping error.

FIG. 3 shows an example uniform mapping scheme. A 16×16 QM (left) is reconstructed from an 8×8 QM (right). Each one frequency position in the 8×8 QM corresponds to a 2×2 frequency region in the 16×16 QM. Hence, uniform mapping is the scheme to map each one of the frequency positions in the 8×8 QM to a 2×2 frequency region in the 16×16 QM, and each of the matrix values of the 16×16 QM within the 2×2 frequency region are the same. However, the simple uniform mapping cannot reflect the transformed coefficients properly. For a 16×16 transformed block, non-zero coefficients may be more concentrated to the top-left region of the matrix than those in the 8×8 transformed block. For example, the frequency position (27) in the 8×8 QM belongs to a middle frequency region, since the transformed coefficient of this position is usually not zero in most applications, while the corresponding mapped frequency position (27) in the 16×16 QM may belong to a high frequency region, since the transformed coefficient of this position in the 16×16 QM may be a zero coefficient. Therefore, a simply uniform mapping usually results in frequency mapping error.

Disclosed herein are apparatuses, systems, schemes, and methods to improve QM coding and reconstruction. In this disclosure, a non-uniform mapping scheme is described to store quantization coefficients of a larger QM using a smaller QM. Using a smaller QM as an input matrix, the larger QM is reconstructed from the smaller QM. The larger QM is separated into several parts and each part is mapped from the smaller size QM by using full or partial areas of the smaller QM separately. For example, the coefficients of an 8×8 quantization matrix are non-uniformly spread into a 16×16 or 32×32 quantization matrix. The larger matrix (16×16 or 32×32) can still be stored as an 8×8 quantization matrix and non-uniform matrix mapping can better reflect the coefficient energy property of a larger transformed block, providing better protection for the low frequency part of the reconstructed lager matrix than uniform mapping. Therefore, the reconstructed lager matrix can achieve better subjective quality when it is applied to the larger transformed block.

Specifically, low frequency components located in a top-left region of the larger size QM may use full or partial low frequency components of a smaller QM, or use partial low frequency components and middle frequency components of a smaller QM. On the other hand, high frequency components located in other regions may use middle frequency components or high frequency components of a smaller QM.

The disclosed scheme has several advantages compared to the uniform up-sampling/down-sampling in the HEVC standard. Since the larger size QM can be stored as a small size QM, additional memory caches and sizes to store the QMs are not needed and the hardware complexity is not increased. The coefficient of energy may be properly reflected in larger transformed blocks with better protection provided to the low frequency region of the reconstructed larger size matrix. Frequency mapping error is therefore reduced. As a result, the reconstructed larger matrix can achieve better subjective quality when it is applied to the larger transformed block.

Figure 4:
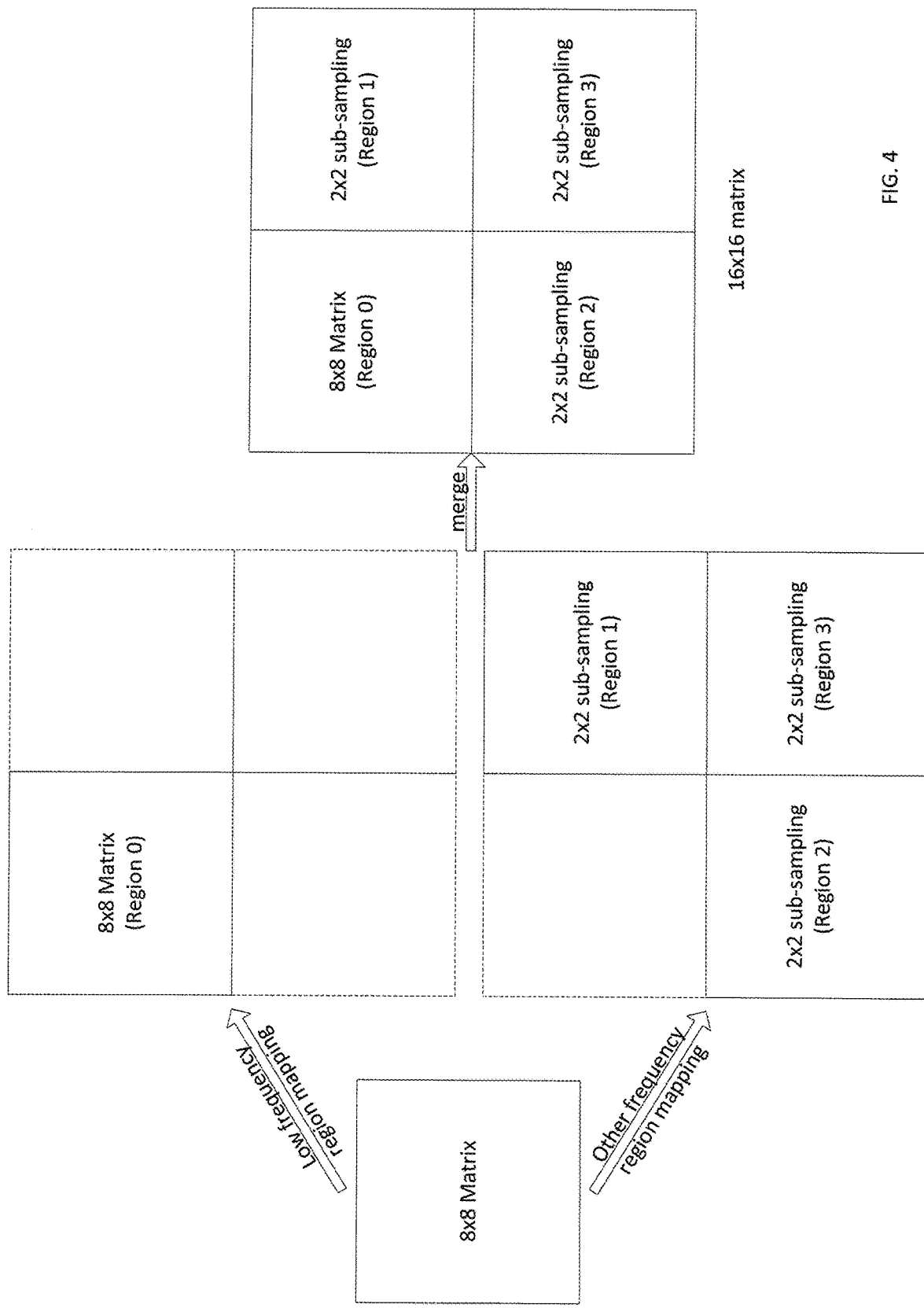
FIG. 4 illustrates an embodiment where a 16×16 matrix is reconstructed through non-uniform mapping from an 8×8 matrix.

FIG. 4 shows an embodiment where a larger matrix (a 16×16 matrix) is split into four regions, a low frequency region (region 0) and three other high frequency regions (region 1, region 2 and region 3). The four regions are mapped from a smaller matrix (an 8×8 matrix) respectively. Since the low frequency region (region 0) is more important, the mapped coefficients in region 0 reuse the full 8×8 matrix coefficients directly. The other three high frequency regions (region 1, region 2, and region 3) are not as important as region 0, so the mapped coefficients in those regions (region 1, region 2 and region 3) are the same as matrix coefficients generated using a 2×2 sub-sampling from the 8×8 matrix.

As shown in FIG. 4, the larger matrix is a 16×16 matrix and the smaller matrix is an 8×8 matrix. It can be seen that, all the coefficients of the 16×16 matrix are stored in the 8×8 matrix. The memory cache to store the 16×16 matrix is not increased compared to the scheme in HEVC since only an 8×8 matrix is stored. The low frequency region in the 16×16 matrix is better protected than in uniform mapping and it is very easy to fetch the coefficients for the low frequency region in the 16×16 matrix from the 8×8 matrix.

Figure 5:
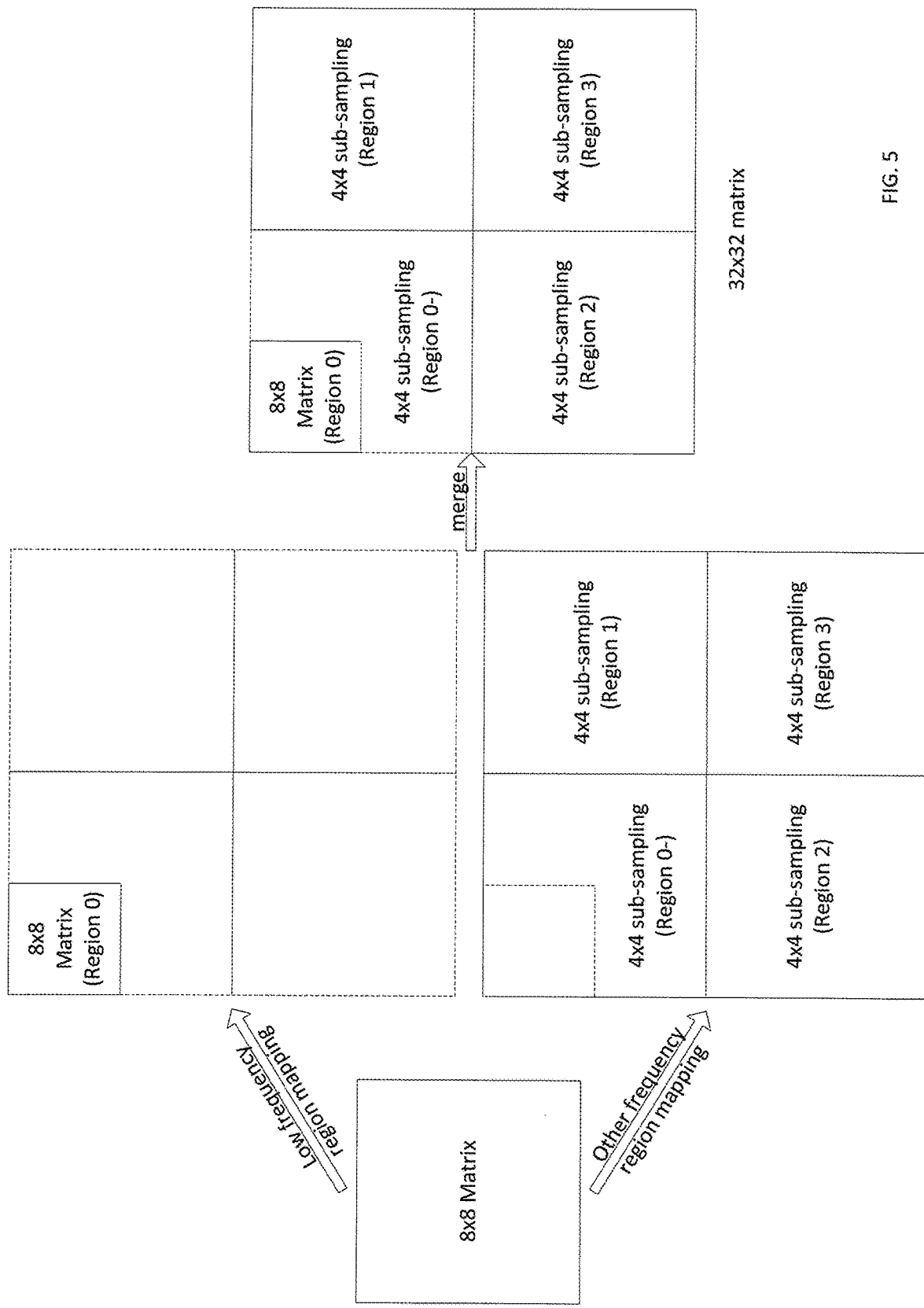
FIG. 5 illustrates an embodiment where a 32×32 matrix is reconstructed through non-uniform mapping from an 8×8 matrix.

FIG. 5 shows an embodiment where a larger matrix (a 32×32 matrix) is split into four regions, a low frequency region (Region 0) and three other high frequency regions (Region 1, Region 2, and Region 3). An 8×8 matrix is again used to populate the larger 32×32 matrix. Only the top-left region of the 32×32 matrix directly reuses the 8×8 matrix. The other regions in the 32×32 matrix use the generated matrix coefficients determined by applying a 4×4 sub-sampling from the 8×8 matrix, wherein the 8×8 matrix coefficients to be used in determining the other regions in the 32×32 matrix may include all the 8×8 matrix coefficients to determine the other regions in the 32×32 matrix, or only the right boundary values of the 8×8 matrix or the bottom boundary values of the 8×8 matrix are used to determine the other regions in the 32×32 matrix, or only the bottom right corner value of the 8×8 matrix is used to determine the other regions in the 32×32 matrix.

Figure 6:
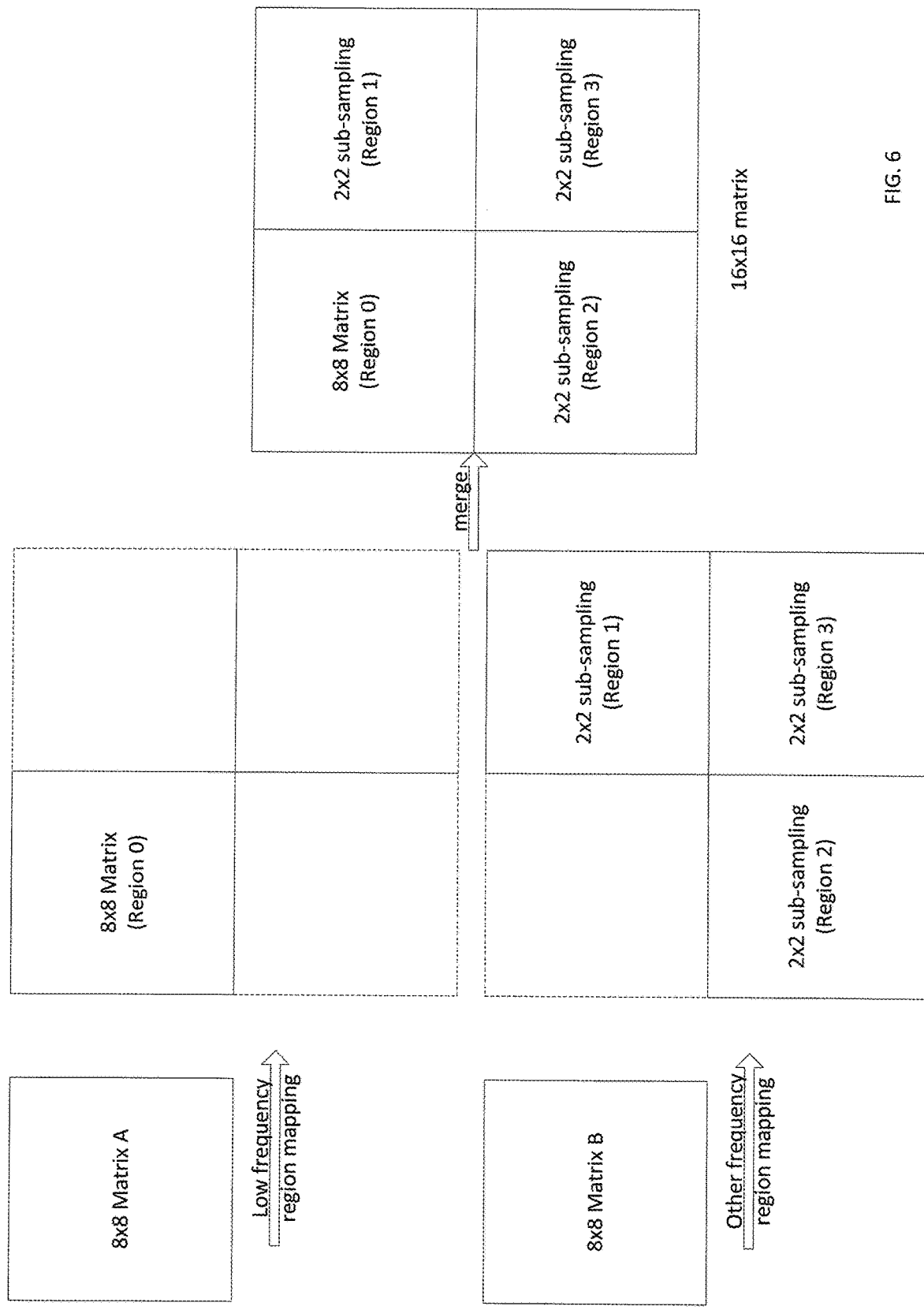
FIG. 6 illustrates an embodiment where a 16×16 matrix is reconstructed through non-uniform mapping from two 8×8 matrices.

FIG. 6 shows an embodiment using two 8×8 matrices to reconstruct a larger 16×16 matrix. In this embodiment, Region 0 is mapped from one fixed 8×8 matrix. The fixed 8×8 matrix stores the important low frequency components of the larger matrix. Region 1, Region 2, and Region 3 may be mapped from another 8×8 matrix using 2×2 subsampling. This 8×8 matrix stores the less important middle and higher frequency components of the larger matrix.

Figure 7:
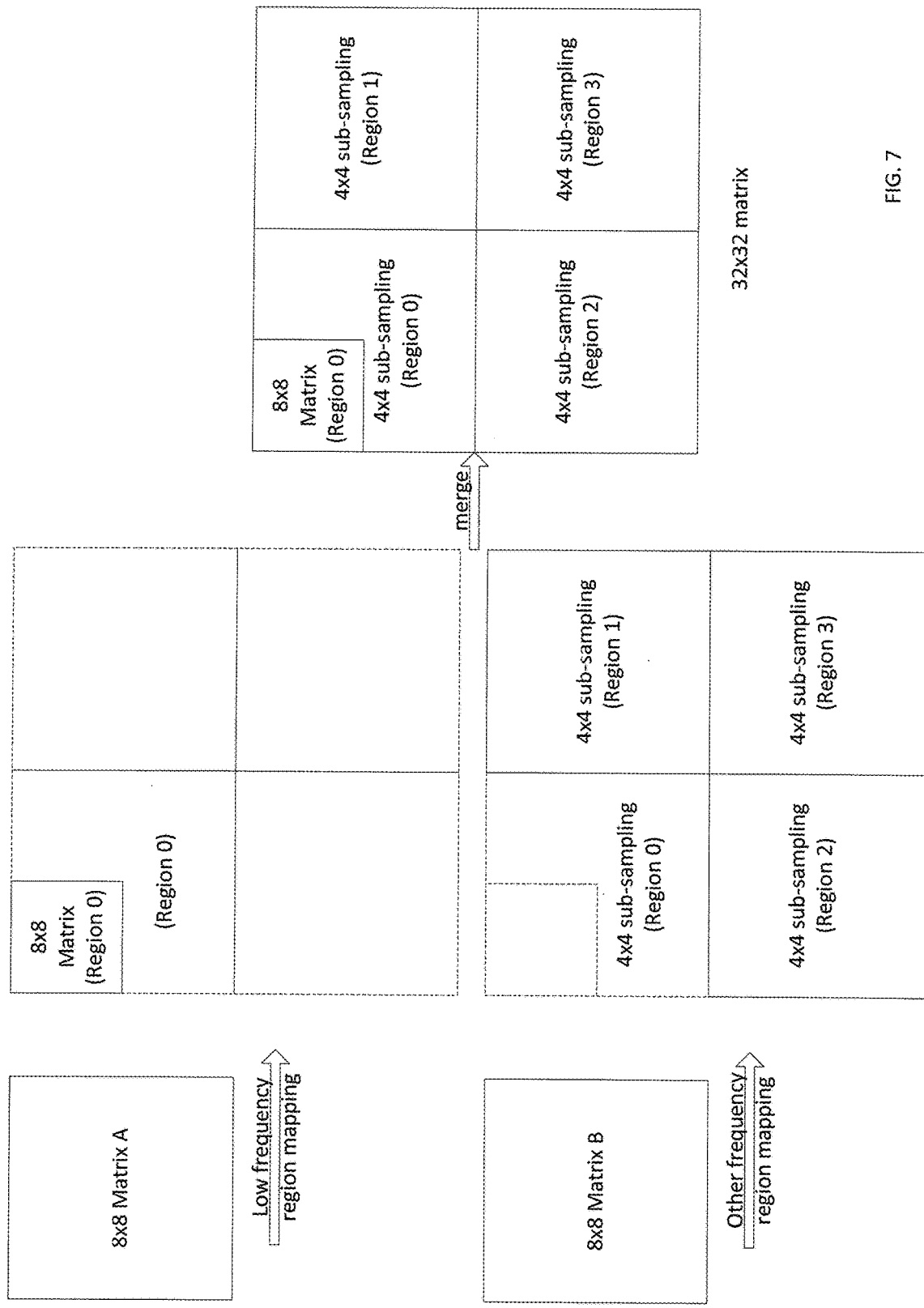
FIG. 7 illustrates an embodiment where a 32×32 matrix is reconstructed through non-uniform mapping from two 8×8 matrices.

FIG. 7 shows an embodiment using two 8×8 matrices to reconstruct a larger 32×32 matrix. In this embodiment, a portion of Region 0 is mapped from one fixed 8×8 matrix. The fixed 8×8 matrix stores the important low frequency components of the larger matrix. Region 1, Region 2, and Region 3 may be mapped from another 8×8 matrix using 4×4 subsampling. This 8×8 matrix stores the less important middle and higher frequency components of the larger matrix. The coefficients in the remaining portion of Region 0 may be mapped using either matrix as desired.

Figure 8:
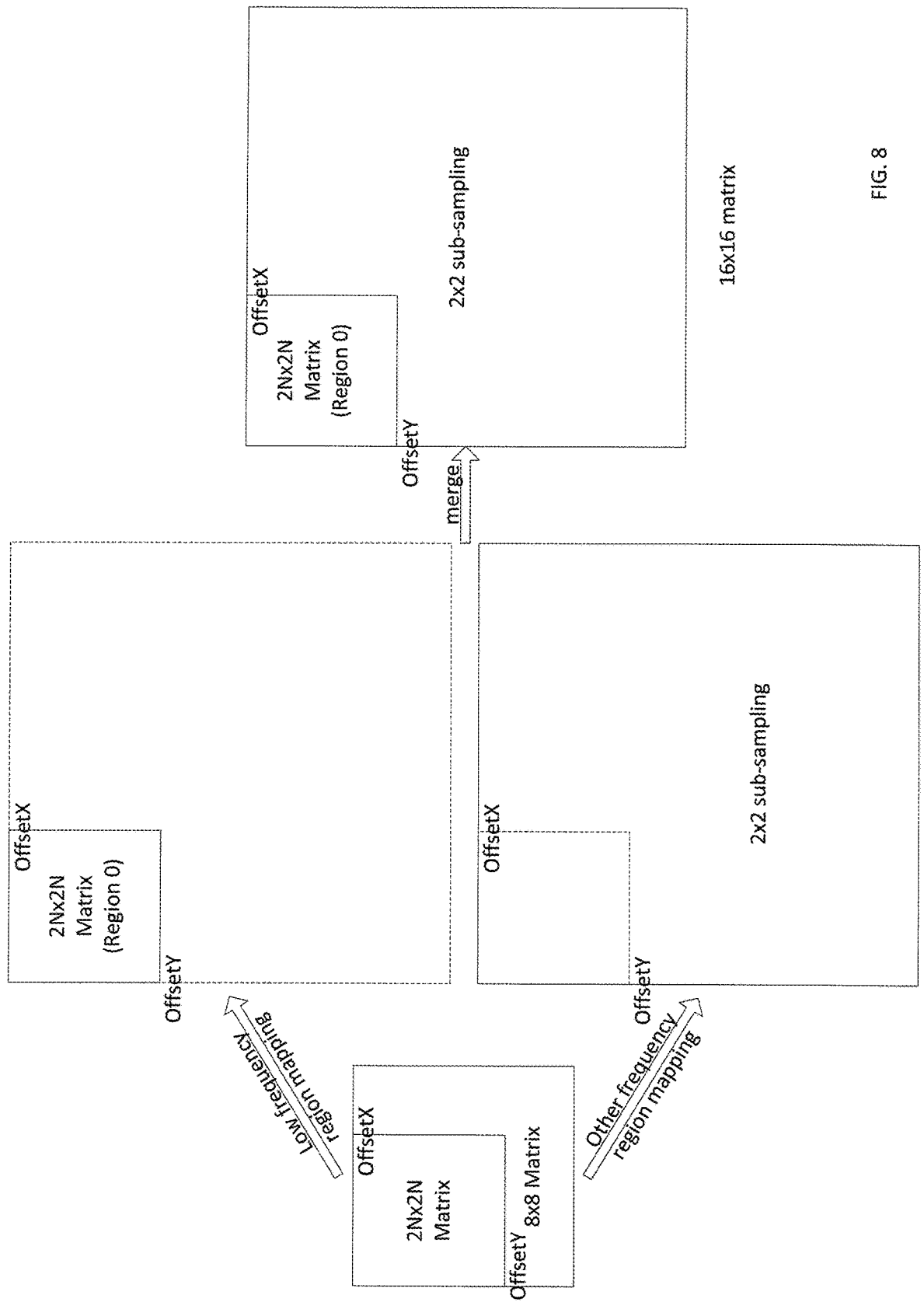
FIG. 8 illustrates an embodiment where two offset values are used in reconstructing a 16×16 matrix from an 8×8 matrix.

FIG. 8 shows an embodiment where two offset values (OffsetX and OffsetY) are defined to split a 16×16 matrix into multiple regions. Each region is mapped from an 8×8 matrix. The frequency region enveloped by OffsetX and OffsetY can be a square region or a non-square region. For the square region, OffsetX equals OffsetY. For the non-square region, OffsetX does not equal OffsetY. For the region enveloped by OffsetX and OffsetY, the coefficients need fine protection. The coefficients in this region reuse the partial region of the 8×8 matrix; while coefficients outside this region use the up-sampling matrix coefficients generated by a sub-sampling from the 8×8 matrix. For the 16×16 matrix reconstruction, the sub-sampling is a 2×2 sub-sampling. The up-sampling values are the up-sampling block values up-sampled from the first quantization matrix, and wherein the up-sampling block values are adjacent values within a 2×2 frequency region.

Figure 9:
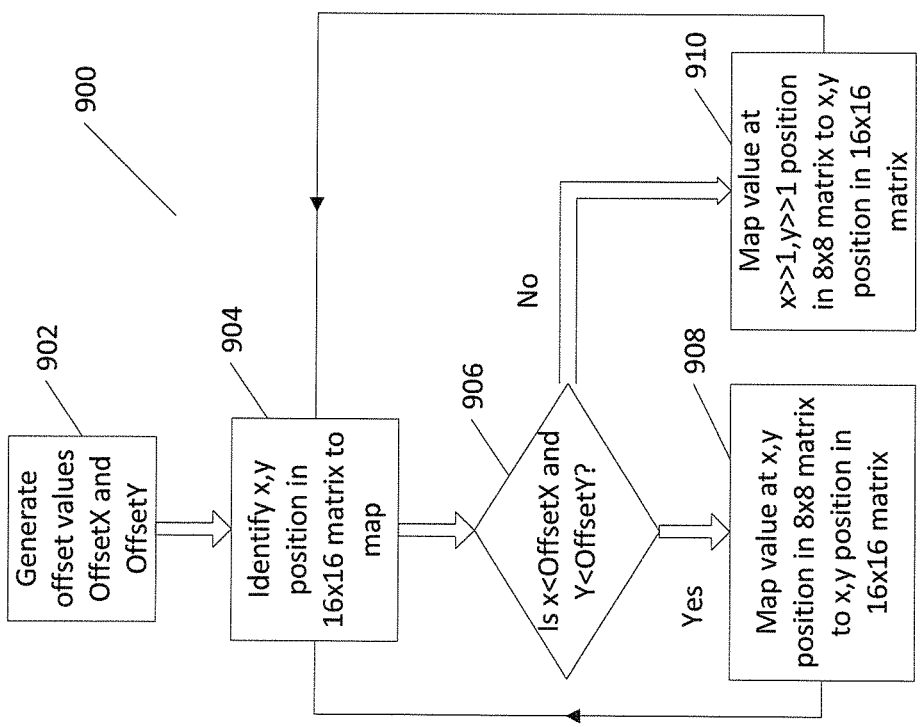
FIG. 9 illustrates an example process for a non-uniform mapping scheme using two offset values in reconstructing a 16×16 matrix from an 8×8 matrix.

FIG. 9 shows an example process 900 for a non-uniform mapping scheme using two offset values in mapping an 8×8 matrix to a 16×16 matrix. Process 900 starts at block 902 where the offset values OffsetX and OffsetY are generated. OffsetX and OffsetY are both less than the maximum size of the smaller matrix. For the 8×8 matrix, OffsetX and OffsetY are both less than 8. In block 904, the x,y coordinate positions in the 16×16 matrix are identified. At block 906, a determination is made as to whether the x coordinate and the y coordinate are less than the respective OffsetX and OffsetY values If the x and y coordinates both fall within the offset values, the 16×16 matrix at the x,y coordinate position is mapped directly from the x,y coordinate position of the 8×8 matrix at block 908. Process 900 returns to block 904 for the next x,y coordinate position. If either or both x,y coordinates are outside of the respective OffsetX and OffsetY values, the 16×16 matrix at the x,y coordinate position is mapped with a value from a coordinate position in the 8×8 matrix by right shifting one from both the x coordinate and y coordinate at block 910. Process 900 returns to block 904 for the next x,y coordinate position.

Figure 10:
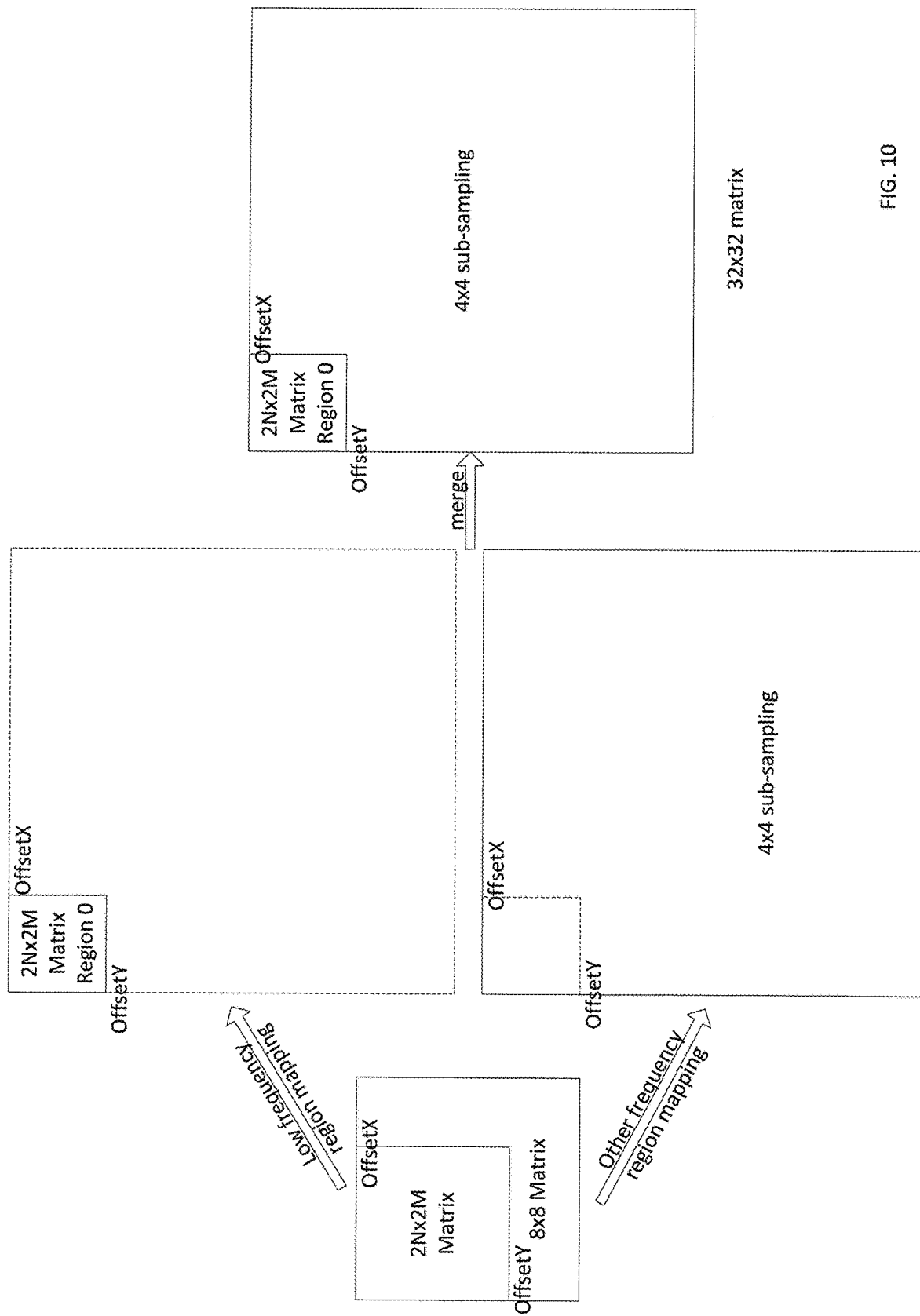
FIG. 10 illustrates an embodiment where two offset values are used in reconstructing a 32×32 matrix from an 8×8 matrix.

FIG. 10 shows an embodiment where two offset values (OffsetX and OffsetY) are defined to split a 32×32 matrix into multiple regions. Each region is mapped from an 8×8 matrix. The frequency region enveloped by OffsetX and OffsetY can be a square region or a non-square region. For the square region, OffsetX equals OffsetY. For the non-square region, OffsetX does not equal OffsetY. For the region enveloped by OffsetX and OffsetY, the coefficients need fine protection. The coefficients in this region reuse the partial region of the 8×8 matrix; while coefficients outside this region use the up-sampling matrix coefficients generated by a sub-sampling from the 8×8 matrix. For the 32×32 matrix reconstruction, the sub-sampling is a 4×4 sub-sampling. The up-sampling values are the up-sampling block values up-sampled from the first quantization matrix, and wherein the up-sampling block values are adjacent values within a 4×4 frequency region.

Figure 11:
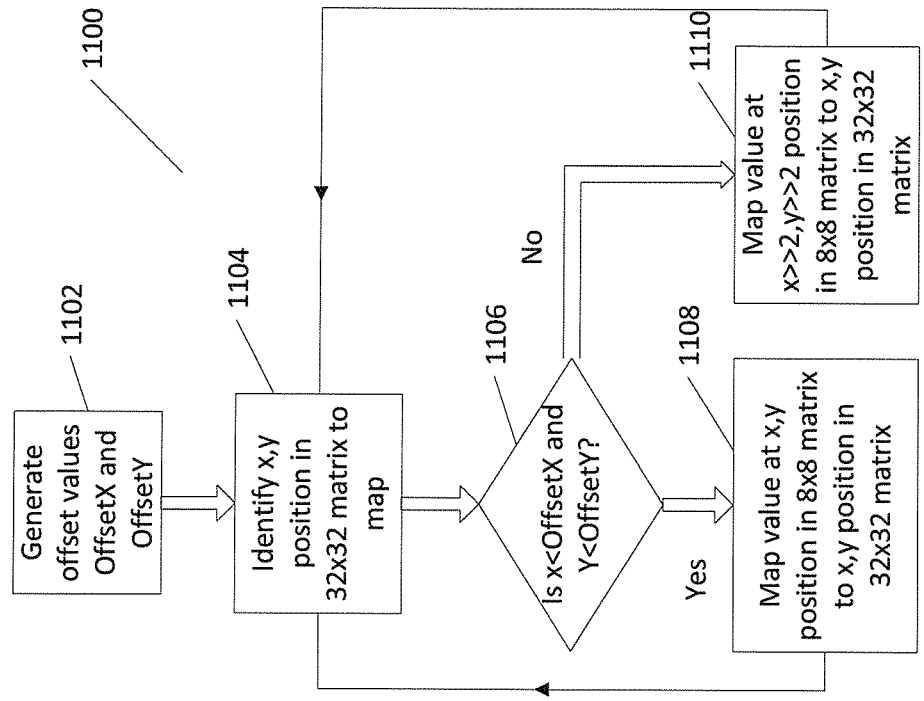
FIG. 11 illustrates an example process for a non-uniform mapping scheme using two offset values in reconstructing a 32×32 matrix from an 8×8 matrix.

FIG. 11 shows an example process 1100 for a non-uniform mapping scheme using two offset values in mapping an 8×8 matrix to a 32×32 matrix. Process 1100 starts at block 1102 where the offset values OffsetX and OffsetY are generated. OffsetX and OffsetY are both less than the maximum size of the smaller matrix. For the 8×8 matrix, OffsetX and OffsetY are both less than 8. In block 1104, the x,y coordinate positions in the 32×32 matrix are identified. At block 1106, a determination is made as to whether the x coordinate and the y coordinate are less than the respective OffsetX and OffsetY values. If the x and y coordinates both fall within the offset values, the 32×32 matrix at the x,y coordinate position is mapped directly from the x,y coordinate position of the 8×8 matrix at block 1108. Process 1100 returns to block 1104 for the next x,y coordinate position. If either or both x,y coordinates are outside of the respective OffsetX and OffsetY values, the 32×32 matrix at the x,y coordinate position is mapped with a value from a coordinate position in the 8×8 matrix by right shifting two from both the x coordinate and y coordinate at block 1110. Process 1100 returns to block 1104 for the next x,y coordinate position.

It should be noted that OffsetX and OffsetY may be predefined in both the encoder and the decoder as a fixed value, e.g., 6, 8, 12, etc. Otherwise, if OffsetX and OffsetY are allowed to be configured in the encoder to offer more flexible non-uniform mapping, OffsetX and OffsetY value can be signalled to the decoder in the bitstream.

Figure 12:
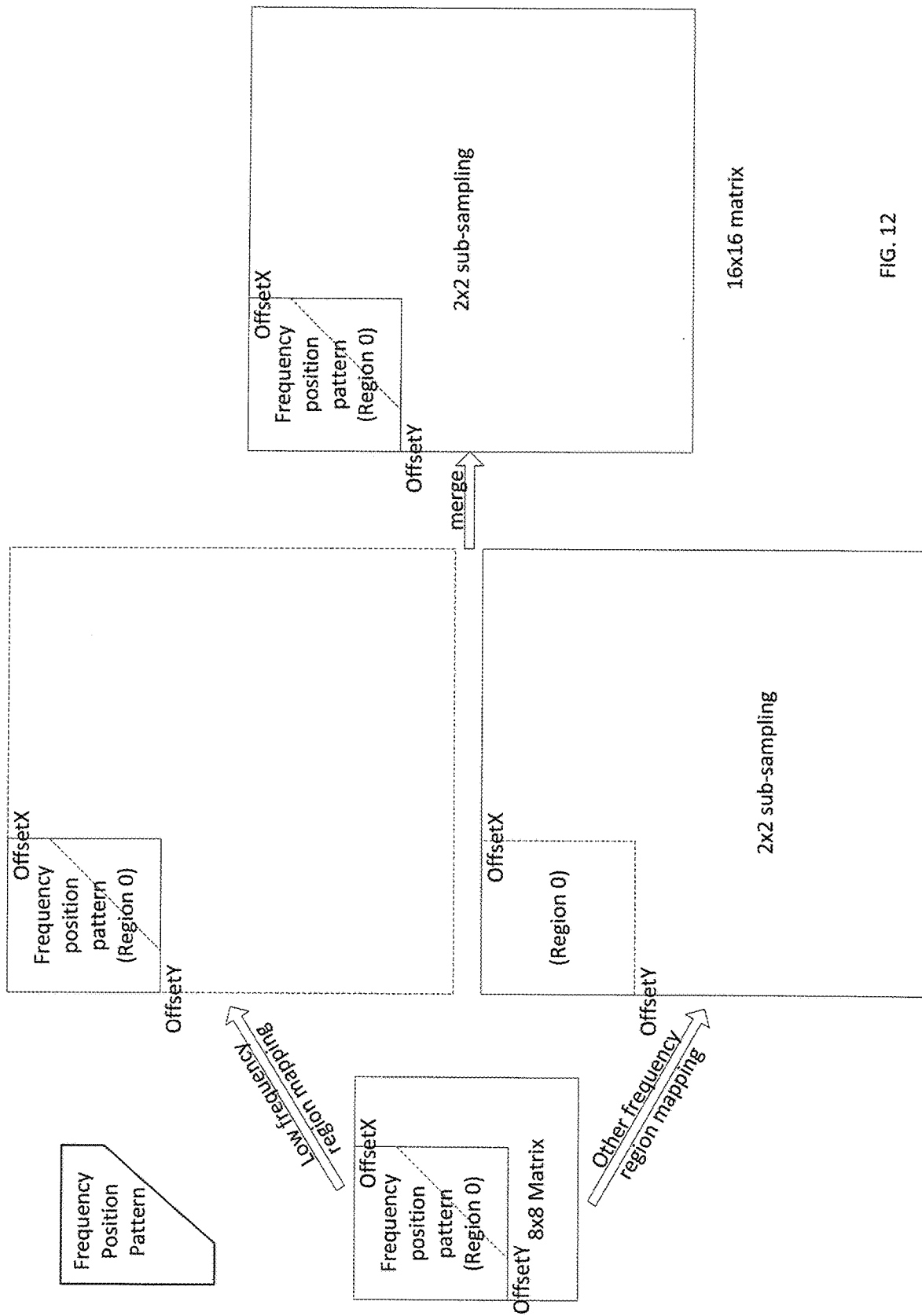
FIG. 12 illustrates an alternate embodiment where two offset values are used in reconstructing a 16×16 matrix from an 8×8 matrix.

FIG. 12 shows an alternate embodiment where two offset values (OffsetX and OffsetY) are defined to split a 16×16 matrix into multiple regions. Each region is mapped from an 8×8 matrix. However, not all coefficients in the frequency region enveloped by OffsetX and OffsetY are mapped directly from the 8×8 matrix. Only partial coefficients in the frequency region enveloped by OffsetX and OffsetY are mapped directly from an 8×8 matrix. The positions of the partial coefficients are indicated in a frequency position pattern matrix. Coefficients with a position indicated in the frequency position pattern may be mapped directly from the 8×8 matrix. Coefficients with frequency positions outside the region of the frequency position pattern matrix may be mapped from the up-sampling matrix, which are coefficients generated by a sub-sampling from the 8×8 matrix. For the 16×16 matrix reconstruction, a 2×2 sub-sampling is performed. For the 32×32 matrix reconstruction, a 4×4 sub-sampling is performed.

Figure 13:
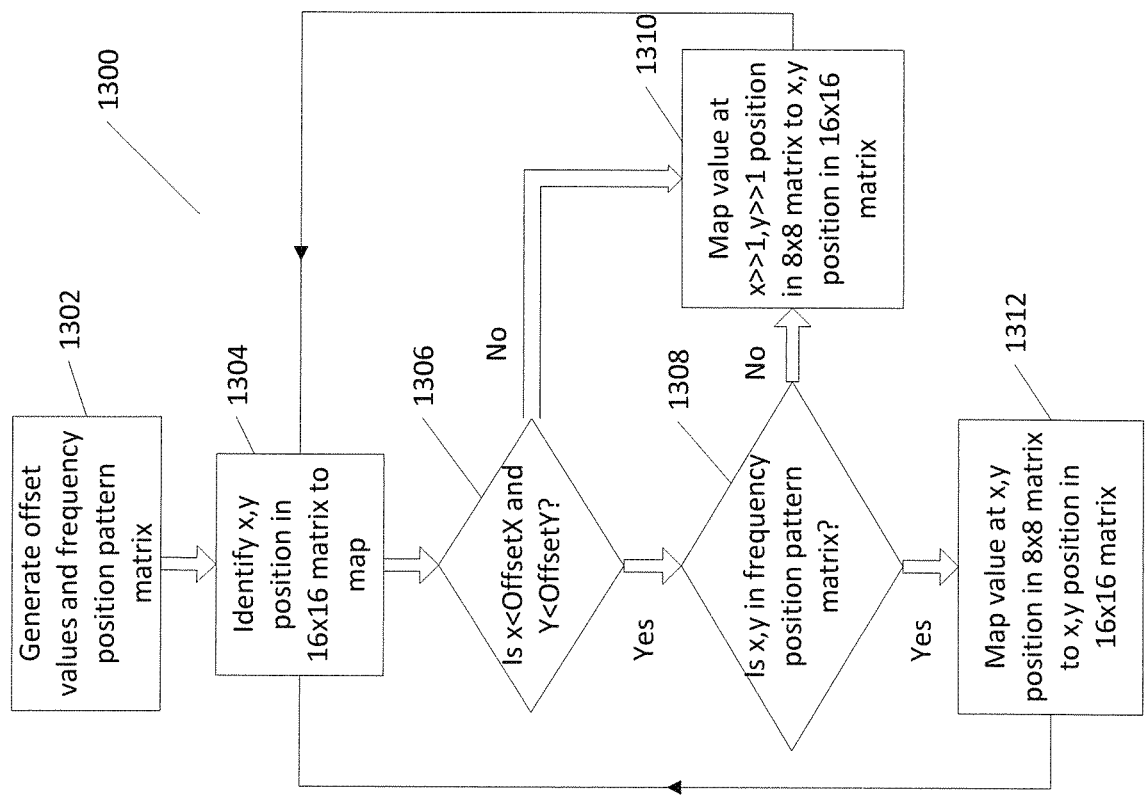
FIG. 13 illustrates an example process for the alternate embodiment for a non-uniform mapping scheme using two offset values reconstructing a 16×16 matrix from an 8×8 matrix.

FIG. 13 shows an example process 1300 for a non-uniform mapping scheme using two offset values in mapping an 8×8 matrix to a 16×16 matrix. Process 1300 starts at block 1302 where the offset values OffsetX and OffsetY and a frequency position pattern matrix are generated. OffsetX and OffsetY are both less than the maximum size of the smaller matrix. For the 8×8 matrix, OffsetX and OffsetY are both less than 8. A frequency position pattern matrix identifies those coefficients that are to be mapped directly from the 8×8 matrix within the offset value range. At block 1304, the x,y coordinate positions in the 16×16 matrix are identified. At block 1306, a determination is made as to whether the x coordinate and the y coordinate are less than the respective OffsetX and OffsetY values. If either or both x,y coordinates are outside of the respective OffsetX and OffsetY values, the 16×16 matrix at the x,y coordinate position is mapped with a value from a coordinate position in the 8×8 matrix by right shifting one from both the x coordinate and y coordinate at block 1310. Process 1300 returns to block 1304 for the next x,y coordinate position. If the x and y coordinates both fall within the offset values, a check is made at block 1308 as to whether the x,y coordinates are selected by the frequency position pattern matrix. If the x,y coordinates are not selected by the frequency position pattern matrix, the 16×16 matrix at the x,y coordinate position is mapped with a value from a coordinate position in the 8×8 matrix by right shifting one from both the x coordinate and y coordinate at block 1310. Process 1300 returns to block 1304 for the next x,y coordinate position. If the x,y coordinates are selected by the frequency position pattern matrix at block 1308, the 16×16 matrix at the x,y coordinate position is mapped directly from the x,y coordinate position of the 8×8 matrix at block 1312. Process 1300 returns to block 1304 for the next x,y coordinate position.

The frequency position condition may be based on a frequency position set, which stores the frequency position of coefficients, instead of a frequency position pattern matrix. The frequency position condition is to determine whether the frequency position needs to be mapped. The frequency position set can be any of a frequency position lookup table, frequency position pattern, frequency weighting model, or any other indicator identifying the frequency positions where special mapping is desired.

Figure 14:
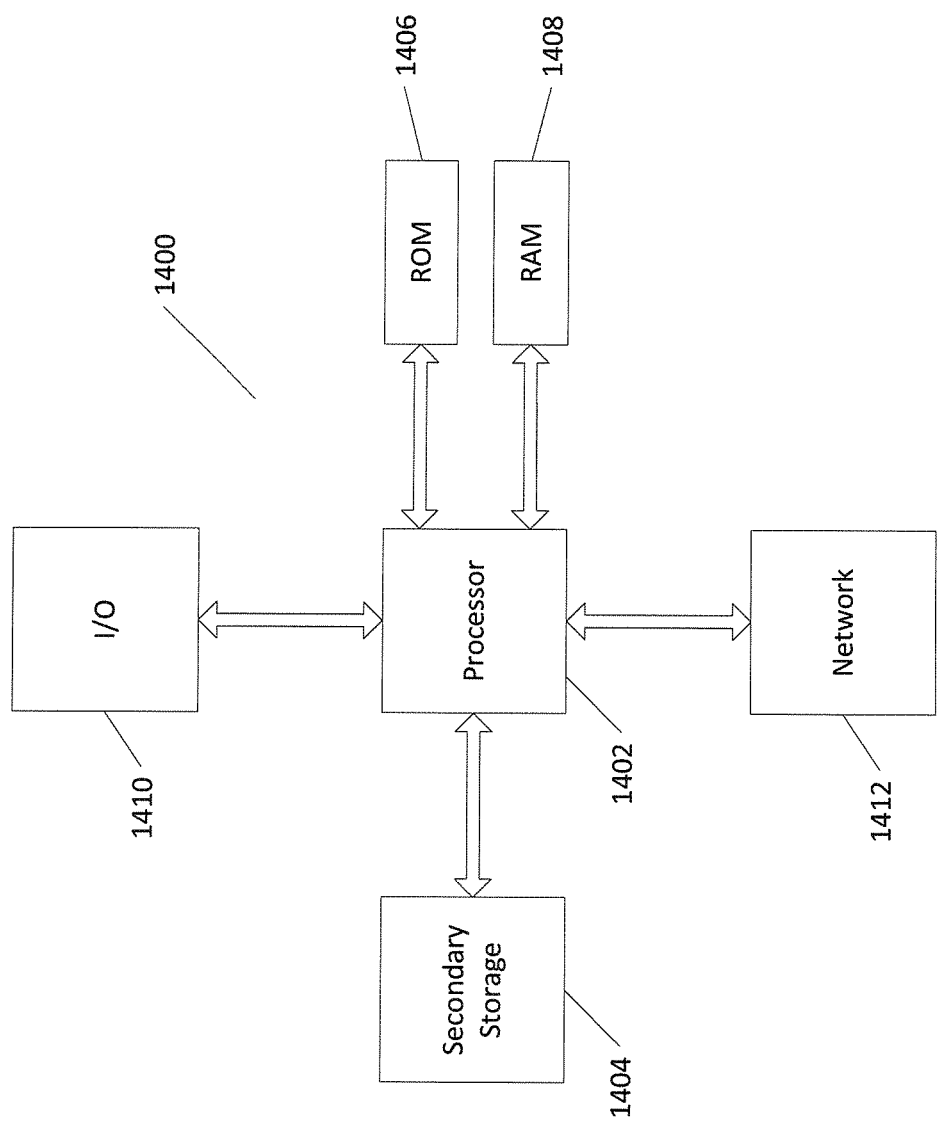
FIG. 14 illustrates an apparatus for implementing one or more embodiments of the features disclosed herein.

FIG. 14 illustrates a computer system 1400 suitable for implementing one or more embodiments of the components disclosed herein. At least some of the features, methods, or video coders disclosed in the embodiments above and described in the present disclosure may be implemented on a computer system, such as a computer system or a network component or node with sufficient processing power, memory resources, and network throughput capability to handle the necessary workload placed upon it. As such, the computer system 1400 may be implemented in transform unit 102, quantization unit 104, and entropy encoder 106 of video encoder 100. The computer system 1400 includes a processor 1402 (which may be referred to as a central processing unit or CPU) that is in communication with memory devices including secondary storage 1404, read only memory (ROM) 1406, random access memory (RAM) 1408, input/output (I/O) devices 1410, and network connectivity devices 1412. The processor 1402 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs. The processor 1402 may be configured to implement embodiments of a method to simplify depth modeling described herein.

The secondary storage 1404 is typically comprised of one or more disk drives or tape drives and is used for non-volatile storage of data and as an over-flow data storage device if RAM 1408 is not large enough to hold all working data. Secondary storage 1404 may be used to store programs that are loaded into RAM 1408 when such programs are selected for execution. The ROM 1406 is used to store instructions and perhaps data that are read during program execution. ROM 1406 is a non-volatile memory device that typically has a small memory capacity relative to the larger memory capacity of secondary storage 1404. The RAM 1408 is used to store volatile data and perhaps to store instructions. Access to both ROM 1406 and RAM 1408 is typically faster than to secondary storage 404.

The I/O devices 1410 may include a video monitor, liquid crystal display (LCD), touch screen display, or other type of video display for displaying video, and may also include a video recording device for capturing video. The video display may have a resolution of 1920×1080 pixels, 1280×720 pixels, 960×540 pixels, or 480×270 pixels, or any other type of suitable resolution. I/O devices 1410 may also include one or more keyboards, mice, or track balls, or other well-known input devices.

The network connectivity devices 1412 may serve as an output and/or input device of computer system 1400. The network connectivity devices 1412 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 1412 may enable the processor 1402 to communicate with an Internet and/or one or more intranets and/or one or more client devices. The network connectivity devices 1412 may transmit and/or receive outputs from video codecs described herein. The I/O devices 1410 and/or network connectivity devices 1412 may be optional if the computer system 1400 has stored in a memory device, such as secondary storage 1404, a video to be compressed or decompressed.

It is understood that by programming and/or loading executable instructions onto the computer system 1400, at least one of the processor 1402, the ROM 1406, and the RAM 1408 are changed, transforming the computer system 1400 in part into a particular machine or apparatus, (such as a service unit, drop point, or a CPE) having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that may be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hard-wires the instructions of the software. In the same manner as a machine controlled by a new ASIC is a particular machine or apparatus, likewise a computer that has been programmed and/or loaded with executable instructions may be viewed as a particular machine or apparatus.

In summary, a non-uniform mapping scheme is described to store quantization coefficients of a larger matrix using a smaller matrix. Using a smaller matrix as an input matrix, the larger matrix is reconstructed from the smaller matrix. The larger matrix is separated into several parts, and each part is mapped from the smaller size matrix by using full or partial portions of the smaller matrix separately. The larger matrix can be mapped from any smaller matrix or multiple smaller matrices. Two offset values (OffsetX and OffsetY) are defined to split the smaller matrix into two regions. Each region is mapped from an 8×8 matrix. The frequency region enveloped by OffsetX and OffsetY can be a square region or a non-square region. For the region enveloped by OffsetX and OffsetY, the coefficients within the region are directly mapped into the larger matrix from the smaller matrix for fine protection. Coefficients outside this region are mapped into the larger matrix using up-sampling matrix coefficients generated by a sub-sampling from the smaller matrix. Not all coefficients in the frequency region enveloped by OffsetX and OffsetY are mapped directly from the smaller matrix. A partial set of coefficients in the frequency region enveloped by OffsetX and OffsetY may be mapping directly from an 8×8 matrix. The positions of the partial coefficients are indicated by a frequency position pattern matrix. Coefficients with a position indicated in the frequency position pattern may be mapped directly from the smaller matrix. Coefficients with a frequency position outside the region of the frequency position pattern may be mapped from an up-sampled matrix generated by a sub-sampling from the smaller matrix. The frequency position condition is based on a frequency position set which stores the frequency position of matrix coefficients. The frequency position condition is to determine whether the frequency position needs to be directly mapped. The frequency position set can be any of a frequency position lookup table, frequency position pattern, and frequency weighting model. The disclosed scheme is described using a smaller quantization matrix as an example to apply non-uniform mapping to a larger quantization matrix. The disclosed scheme is still suitable for applying non-uniform mapping on a scaling matrix, a transformed coefficients matrix, a frequency position pattern, and a frequency weighting quantization model.

In some embodiments, some or all of the functions or processes of the one or more of the devices are implemented or supported by a computer program that is formed from computer readable program code and that is embodied in a computer readable medium. The phrase "code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

At least one embodiment is disclosed and variations, combinations, and/or modifications of the embodiment(s) and/or features of the embodiment(s) may be made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment and k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means+/−10% of the subsequent number unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive with the intention of not being limited to the details given herein. For example, the various elements or components may be combined or integrated in another system or certain features may be omitted or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are readily ascertainable by one skilled in the art and could be made without departing from the spirit and scope disclosed herein.

What is claimed is:

1. A method for non-uniform mapping for quantization matrix coefficients between different sizes of quantization matrices in image coding or video coding, the method comprising:
    obtaining a P×P quantization matrix having first and second coordinate dimensions, wherein P is an integer;
    obtaining a frequency position pattern indicative of respective coordinate positions of a first plurality of coefficients and a second plurality of coefficients within the P×P quantization matrix, wherein the second plurality of coefficients are separate from the first plurality of coefficients and correspond to higher frequencies than the first plurality of coefficients;
    constructing a Q×Q quantization matrix, Q being an integer greater than P, such that the Q×Q quantization matrix is larger than the P×P quantization matrix; and
    populating the Q×Q quantization matrix with values from the P×P quantization matrix through non-uniform mapping of the first plurality of coefficients and the second plurality of coefficients, wherein the non-uniform mapping includes:
        mapping the first plurality of coefficients to coordinate positions in the Q×Q quantization matrix that correspond to respective coordinate positions of the first plurality of coefficients in the P×P quantization matrix;
        up-sampling coefficients in the second plurality of coefficients to provide up-sampled coefficients;
        mapping the up-sampled coefficients to coordinate positions in the Q×Q quantization matrix that do not correspond to coordinate positions of the first plurality of coefficients in the P×P quantization matrix; and
    providing the P×P quantization matrix and the Q×Q quantization matrix to an image encoder or a video encoder to quantize P×P blocks of transform coefficients and Q×Q blocks of transform coefficients respectively.

2. The method of claim 1, wherein populating the Q×Q quantization matrix includes:
    mapping the first plurality of coefficients into an upper left portion of the Q×Q quantization matrix; and
    mapping the up-sampled coefficients into a remaining portion of the Q×Q quantization matrix.

3. The method of claim 2, wherein:
    the first plurality of coefficients include coefficients in a 2N by 2M block of coefficients in the P×P quantization matrix, where N and M are integers and N and M are less than P/2; and
    the second plurality of coefficients include coefficient values in the P×P quantization matrix that are outside of the 2N by 2M block of coefficients in the P×P quantization matrix.

4. The method of claim 2, wherein the second plurality of coefficients include coefficients from a bottom right corner of the P×P quantization matrix.

5. The method of claim 1, where P=8 and Q=16 such that the P×P quantization matrix is an 8×8 matrix and the Q×Q quantization matrix is a 16×16 matrix.

6. The method of claim 1, where P=8 and Q=32 such that the P×P quantization matrix is an 8×8 matrix and the Q×Q quantization matrix is a 32×32 matrix.

7. A method for non-uniform mapping for quantization matrix coefficients from a first P×P quantization matrix and a second P×P quantization matrix to a Q×Q quantization matrix, where P and Q are integers and P is less than Q, the method comprising:
    obtaining the first P×P quantization matrix having first and second coordinate dimensions;
    obtaining a frequency position pattern indicative of coordinate positions of a first plurality of coefficients in the first P×P quantization matrix, wherein the first plurality of coefficients include coefficients having first and second coordinate positions in the first and second coordinate dimensions, respectively, the first and second coordinate positions being not greater than respective first and second offset values along the first and second coordinate dimensions, respectively;
    constructing the Q×Q quantization matrix;
    obtaining the second P×P quantization matrix including a second plurality of coefficients, the second plurality of coefficients having first and second coordinate positions in the first and second coordinate dimensions, respectively, that are greater than the respective first and second offset values;
    populating the Q×Q quantization matrix including:
        mapping values of the first plurality of coefficients in the first P×P quantization matrix into respective corresponding coordinate positions in a first portion of the Q×Q quantization matrix having respective first and second coordinates that are not greater than the respective first and second offset values;
        up-sampling the second plurality of coefficients to provide a plurality of up-sampled coefficients; and
        mapping the plurality of up-sampled coefficients into a second portion of the Q×Q quantization matrix, each mapped up-sampled coefficient having respective first and second coordinates that are greater than the respective first and second offset values; and
    providing the first P×P quantization matrix and the Q×Q quantization matrix to an image encoder or a video encoder to quantize P×P blocks of transform coefficients and Q×Q blocks of transform coefficients respectively.

8. An apparatus for non-uniform mapping of quantization matrix coefficients between different sizes of quantization matrices in image coding or video coding, the apparatus comprising:
- a memory configured to store data and instruction code; and
- a processor, upon executing the instruction code, configured to:
- obtain a P×P quantization matrix having first and second coordinate dimensions, where P is an integer;
- obtain a frequency position pattern indicative of respective coordinate positions of a first plurality of coefficients and a second plurality of coefficients within the P×P quantization matrix, wherein the second plurality of coefficients are separate from the first plurality of coefficients and correspond to higher frequencies than the first plurality of coefficients;
- construct a Q×Q quantization matrix, where Q is an integer greater than P, such that the Q×Q quantization matrix is larger than the P×P quantization matrix; and
- populate the Q×Q quantization matrix with values from the P×P quantization matrix through non-uniform mapping of the first plurality of coefficients and the second plurality of coefficients, wherein the processor is configured to:
  - map the first plurality of coefficients to coordinate positions in the Q×Q quantization matrix that correspond to respective coordinate positions of the first plurality of coefficients in the P×P quantization matrix,
  - up-sample coefficients in the second plurality of coefficients to provide up-sampled coefficients; and
  - map the up-sampled coefficients to coordinate positions in the Q×Q quantization matrix that do not correspond to positions of the first plurality of coefficients in the P×P quantization matrix; and
- provide the P×P quantization matrix and the Q×Q quantization matrix to an image encoder or a video encoder to quantize P×P blocks of transform coefficients and Q×Q blocks of transform coefficients respectively.

9. The apparatus of claim 8, wherein the processor, in populating the Q×Q quantization matrix, is configured to:
- map the first plurality of coefficients into an upper left portion of the Q×Q quantization matrix; and
- map the up-sampled coefficients into a remaining portion of the Q×Q quantization matrix.

10. The apparatus of claim 8, wherein the processor in populating the Q×Q quantization matrix is configured to:
- identify a first portion of the P×P quantization matrix having coordinates in the first and second coordinate dimensions that are not greater than respective first and second offset values along the first and second coordinate dimensions, respectively, as including the first plurality of coefficients;
- map coefficients in the first portion of the P×P quantization matrix into a most upper left portion of the Q×Q quantization matrix; and
- map the up-sampled coefficients into coefficient positions in a second portion of the Q×Q quantization matrix, the coefficient positions in the second portion of the Q×Q quantization matrix having respective first and second coordinate values that are greater than the respective first and second offset values, wherein the up-sampled coefficients are obtained by up-sampling coefficients of the second plurality of coefficients from a portion of the P×P quantization matrix including coefficients having coordinate positions that are greater than the respective first and second offset values.

11. The apparatus of claim 10, wherein the first and second offset values include a frequency position offset value along the first coordinate dimension and a frequency position offset value along the second coordinate dimension.

12. The apparatus of claim 10, wherein the first and second coordinate dimensions are identified by (x; y) coordinate values and the processor in populating the Q×Q quantization matrix is configured to:
- identify (x; y) coordinates in the Q×Q quantization matrix; and
- map a coefficient at the (x; y) coordinates in the P×P quantization matrix to a coefficient at the (x; y) coordinates in the Q×Q quantization matrix, when the (x; y) coordinates are not greater than the respective first and second offset values.

13. The apparatus of claim 12, wherein the processor in populating the Q×Q quantization matrix is configured to:
- map a coefficient in the P×P quantization matrix having respective (x; y) coordinates that are right shifted by one bit position from the (x; y) coordinates in the Q×Q quantization matrix to the (x; y) coordinates in the Q×Q quantization matrix, when one or both of the (x; y) coordinates in the Q×Q quantization matrix are greater than one or both of the respective first and second offset values.

* * * * *